Feb. 5, 1929.
H. S. BERGDOLL
1,700,785
WINDSHIELD HEATER
Original Filed Jan. 13, 1928
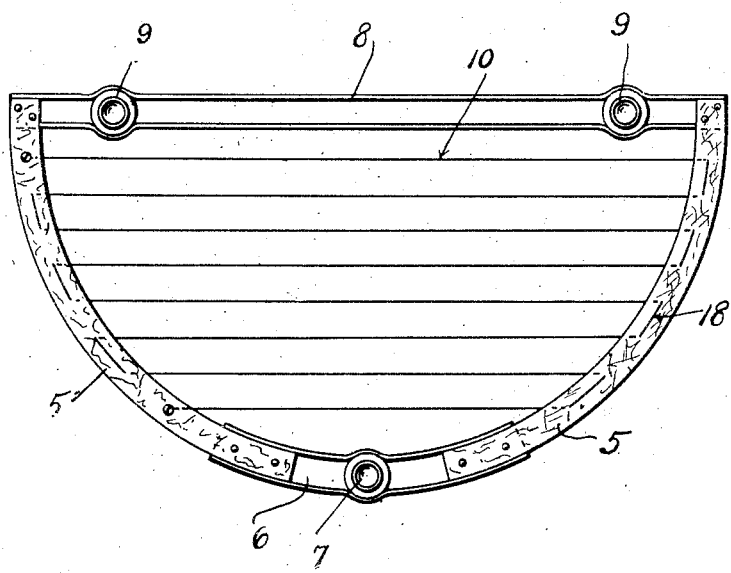
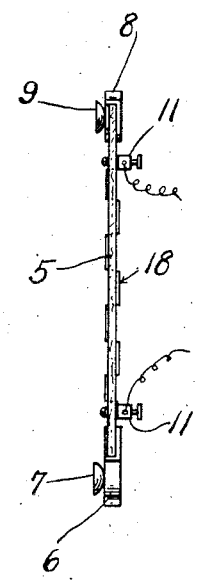
Inventor
Homer S. Bergdoll
By *[signature]*
Attorney Patented Feb. 5, 1929.

1,700,785

UNITED STATES PATENT OFFICE.

HOMER S. BERGDOLL, OF THOMAS, WEST VIRGINIA.

WINDSHIELD HEATER.

Application filed January 12, 1928, Serial No. 246,525. Renewed December 8, 1928.

This invention relates to new and useful improvements in heaters for windshields, and aims to provide a more simple and improved structure than that device disclosed and claimed in my prior Patent #1,565,046.

To the attainment of this end there is provided a windshield heater comprising but few structural elements and having means directly associated therewith whereby the heater may be secured to the windshield without the requirement of brackets or other extraneous attaching features.

With the foregoing and other objects in view as the nature of the invention will be better understood, the same comprises the novel form, combination and arrangement of parts hereinafter more fully described, shown in the accompanying drawing and claimed.

In the accompanying drawing wherein like reference characters indicate corresponding parts throughout both views:

Figure 1 is a side elevation of my improved heater, and

Figure 2 is an edge view thereof.

Now having particular reference to the drawings, the novel heater consists of a pair of segmental fibre strips 5—5, the inner ends of which are rigidly secured in overlapping relation to the opposite ends of a curved metallic connection strip 6, equipped intermediate its ends with a suitable vacuum cup 7.

The outer ends of the segmental fibre strips 5—5 are interconnected through the medium of an elongated metallic connection strip 8 that is equipped adjacent its opposite ends with cooperating vacuum cups 9—9, said three cups being for the purpose of providing means of attachment of the units to the inside of an automobile windshield.

Arranged horizontally between the fibre strips 5—5 are the cross runs of an electric conductor wire 10, the ends of which are fixed to binding posts 11 to facilitate the attachment of positive and negative conductor wires thereto, which wire may be attached to the ignition switch, the ammeter or direct to the storage battery of the automobile.

It will be obvious that a heater of this character may be quickly attached to an automobile windshield adjacent the driver of the machine and that when so attached will prevent the accumulation of condensation, snow or ice upon the windshield directly in front of the driver and that will at the same time permit a proper view through the windshield by the driver.

Having thus described the invention, what I claim as new and desire to secure by Letters Patent is:—

In a windshield heater of the character described, a pair of arcuate shaped members of insulating material, an arcuate shaped connector adapted to connect adjacent ends of said members to provide a semi-circular frame, a cross bar connecting the outer ends of said members, and electrical heating elements trained back and forth between said insulating members, and supporting members carried by said connector and cross bar.

In testimony whereof I affix my signature.

HOMER S. BERGDOLL.